(12) United States Patent
Smith

(10) Patent No.: US 11,584,290 B1
(45) Date of Patent: Feb. 21, 2023

(54) DUAL PURPOSE LIFT PEDESTAL

(71) Applicant: Jared Smith, Rosemount, MN (US)

(72) Inventor: Jared Smith, Rosemount, MN (US)

(*) Notice: Subject to any disclaimer, the term of this patent is extended or adjusted under 35 U.S.C. 154(b) by 400 days.

(21) Appl. No.: 16/703,849

(22) Filed: Dec. 4, 2019

Related U.S. Application Data

(60) Provisional application No. 62/775,173, filed on Dec. 4, 2018.

(51) Int. Cl.
| | |
|---|---|
| *B60P 3/39* | (2006.01) |
| *A47B 9/10* | (2006.01) |
| *F16M 11/28* | (2006.01) |
| *A47B 85/06* | (2006.01) |
| *A47C 19/22* | (2006.01) |
| *A47B 9/20* | (2006.01) |

(52) U.S. Cl.
CPC ................ *B60P 3/39* (2013.01); *A47B 9/10* (2013.01); *A47B 9/20* (2013.01); *A47B 85/06* (2013.01); *A47C 19/22* (2013.01); *F16M 11/28* (2013.01); *A47B 2200/0051* (2013.01)

(58) Field of Classification Search
CPC .... A47B 9/02; A47B 9/10; A47B 9/20; A47B 2200/0054; A47C 3/30; A47C 3/40; F16M 11/28
USPC ........................................ 108/147; 248/188.5
See application file for complete search history.

(56) References Cited

U.S. PATENT DOCUMENTS

| | | | | |
|---|---|---|---|---|
| 6,299,113 | B1* | 10/2001 | Yamashita | A47C 3/40 248/161 |
| 9,629,452 | B1* | 4/2017 | Chen | A47B 9/20 |
| 10,107,448 | B1* | 10/2018 | Hung | A47B 9/20 |
| 10,226,119 | B1* | 3/2019 | Ko | A47B 9/20 |
| 10,524,564 | B1* | 1/2020 | Wu | A47B 9/20 |
| 2006/0054066 | A1* | 3/2006 | Kopala | A47B 9/00 108/147 |
| 2010/0126393 | A1* | 5/2010 | Moller | A47B 9/20 108/147 |
| 2012/0043436 | A1* | 2/2012 | Atkinson | A47B 9/20 248/188.5 |
| 2014/0360415 | A1* | 12/2014 | Riis | A47B 9/20 248/354.1 |
| 2015/0047538 | A1* | 2/2015 | Ergun | A47B 9/02 248/188.5 |
| 2015/0164218 | A1* | 6/2015 | Bonuccelli | A47B 9/20 248/188.5 |
| 2017/0238697 | A1* | 8/2017 | Randløv | A47B 13/021 |
| 2018/0303233 | A1* | 10/2018 | DeGroot | A47B 9/20 |
| 2019/0261778 | A1* | 8/2019 | Lukas | G01S 7/497 |

(Continued)

*Primary Examiner* — Jose V Chen
(74) *Attorney, Agent, or Firm* — Johnson and Phung LLC; Thomas N. Phung

(57) ABSTRACT

A dual-purpose lift pedestal for use in recreational vehicles having a top and bottom base plate, a housing moveable between a down position, an up position and an extended position, the housing having an upper tube, a middle tube, and a lower tube, a first set of slider pads supporting a second end of the upper tube within the middle tube, a second set of slider pads supporting the second end of the middle tube within the lower tube, a spring cage supporting within the middle tube, a pair of springs at least partially supported within the spring cage with the springs co-acting to assist the movement of the housing between the various position, and a locking member to maintain the housing at the upper position and at the down position.

20 Claims, 5 Drawing Sheets

(56) References Cited

U.S. PATENT DOCUMENTS

| | | | |
|---|---|---|---|
| 2020/0132116 A1* | 4/2020 | Walling | F16C 29/02 |
| 2021/0052066 A1* | 2/2021 | Wu | A47B 9/20 |
| 2021/0112970 A1* | 4/2021 | Polz | F16H 25/2015 |
| 2021/0339990 A1* | 11/2021 | Yoo | A47B 9/04 |

\* cited by examiner

DUAL PURPOSE LIFT PEDESTAL

CROSS REFERENCE TO RELATED APPLICATIONS

This application claims priority to U.S. Provisional Application Ser. No. 62/775,173; filed on Dec. 4, 2018; titled DUAL PURPOSE LIFT PEDESTAL.

FIELD OF INVENTION

The field of the invention relates generally to telescoping pedestal table legs, and more particularly to a dual-purpose telescoping pedestal table leg for use in tight or crowded or confined environment such as recreational vehicle (RV) based fishing ice houses wherein the telescoping pedestal table leg allows the table top to be adjusted to multiple positions.

STATEMENT REGARDING FEDERALLY SPONSORED RESEARCH OR DEVELOPMENT

None

REFERENCE TO A MICROFICHE APPENDIX

None

BACKGROUND OF THE INVENTION

Summary of the Invention

Briefly, the present invention comprises a dual-purpose lift pedestal that includes a top base plate having a table top engaging first side and a second side, a bottom base plate having a first side and a second-floor engaging side, and a housing moveable between a sleep cushion supporting down position, a table-use up position and an extended position allowing for the installation of legs to a bottom side of a table top.

The housing includes an upper tube having a first end attached to the second side of the top base plate and a second end, a middle tube having a first end for receiving the second end of the upper tube and a second end, and a lower tube having a first end for receiving the second end of the middle tube and a second end attached to the first side of the bottom base plate. A first set of slider pads supports the second end of the upper tube within the middle tube and a second set of slider pads supported the second end of the middle tube within the lower tube.

The dual-purpose lift pedestal also includes a gas spring cage located within the middle tube with the gas spring cage partially supporting a first gas spring and a second gas spring within the gas spring cage. The first gas spring includes an extendable arm extending therefrom with the extendable arm having an end secured to the second side of the top base plate. Similarly, the second gas spring includes an extendable arm extending therefrom with the extendable arm of the second gas spring having an end secured to the first side of the bottom base plate. The first and second gas springs co-acting to assist the movement of the housing between the down position, the up position and the extended position.

The dual-purpose lift pedestal further includes a swing support arm having a first end pivotably attached to the second side of the top base plate and a second end having a securement member engageable to a first locking member located on the lower tube to maintain the housing in the up position and engageable to a second locking member located on the lower tube to maintain the housing in the down position.

DESCRIPTION OF THE PREFERRED EMBODIMENT

Figure 1:
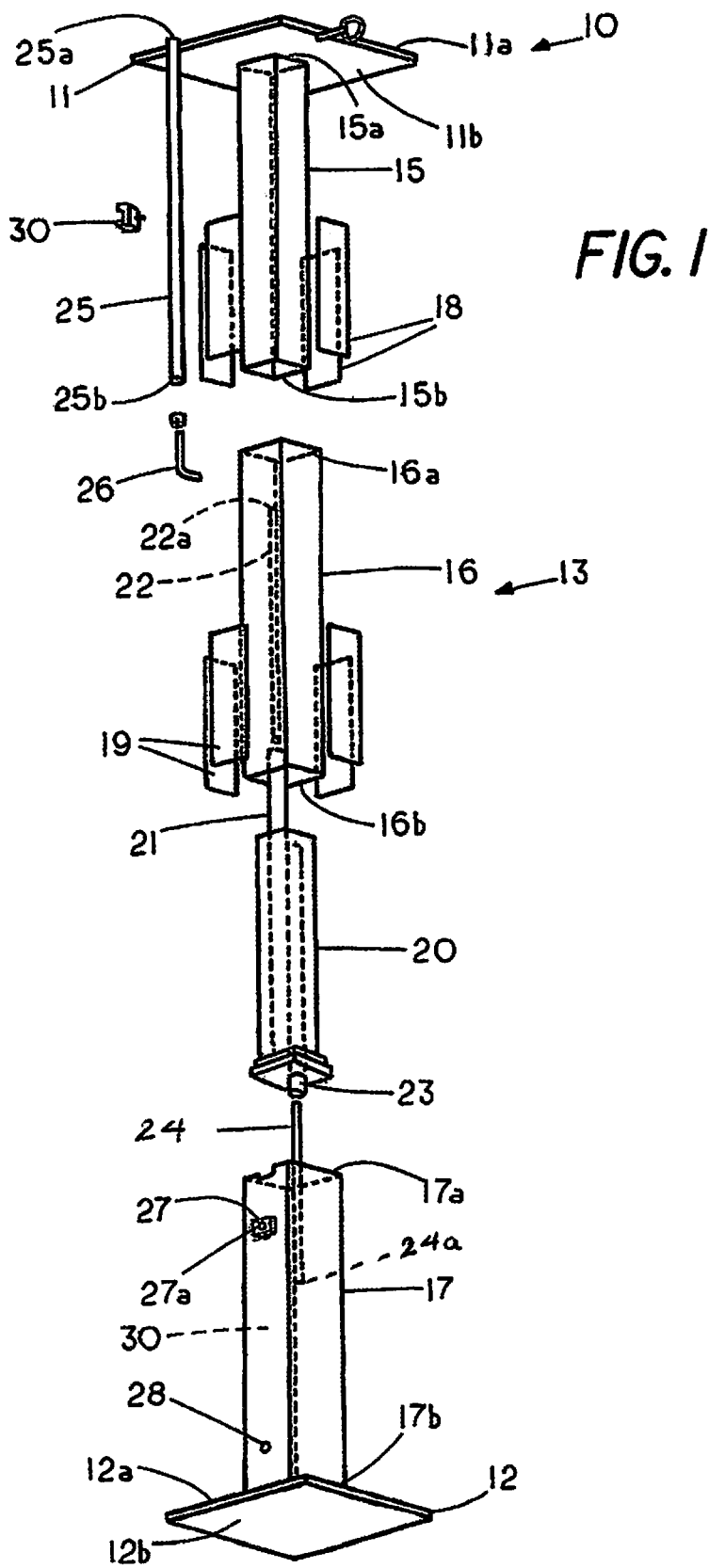
FIG. 1 is a blow-up view of an embodiment of a dual-purpose lift pedestal of the present invention.

The general purpose of the present invention, which will be described subsequently in greater detail, is to provide a telescoping pedestal table leg for use in tight or confined environment such as recreational vehicle (RV) based fishing ice houses wherein the telescoping pedestal table leg allows the table top to be adjusted between multiple positions.

There has thus been outlined the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the disclosing subject matter be regarded as including such equivalent constructions insofar as they do not depart from the spirit and scope of the present invention.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

In addition, the accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of any potential claims.

FIG. 1 is a blow-up view of an embodiment of a dual-purpose lift pedestal 10 of the present invention. Dual-purpose lift pedestal 10 generally includes a top base plate 11 having a table top engaging first side 11a and a second side 11b, a bottom base plate 12 having a first side 12a and a second recreational vehicle floor engaging side 12b and a housing 13 moveable or adjusted between 3 specific positions, namely between a sleep cushion supporting down position, a table-use up position and a fully extended position, which may also be referred to as an "add legs" position, allowing for the installation of table legs to a bottom side 14a of a table or table top 14 (shown in FIGS. 2-4).

Housing 13 includes an upper tube 15 having a first end 15a attached to the second side 11b of the top base plate 11 and a second end 15b, a middle tube 16 having a first end 16a for receiving the second end 15b of the upper tube 15 and a second end 16b, and a lower tube 17 having a first end 17a for receiving the second end 16b of the middle tube 16 and a second end 17b attached to the first side 12a of the bottom base plate 12 to generally form a three-tube telescoping pedestal or leg assembly. Supporting the second end 15b of the upper tube 15 within the middle tube 16 is a first set of slider pads 18 and supporting the second end of the middle tube within the lower tube is a second set of slider pads 19.

It is noted that slider pads 18 and 19 may be shimmed to create an ideal balance between force required to move the tubes 15 and 16 up and down inside the larger lower tube 17 and the rigidity that keeps the table top 14 steady when the dual-purpose lift pedestal 10 is used as a stand-alone pedestal leg. The same slider pads may be used between the upper tube 15 and middle tube 16 of the dual-purpose lift pedestal 10. For added lubricity, lubricants may be added to the slider pads 18 and 19 to improve the function of the lift of dual-purpose lift pedestal 10. In the embodiment of FIGS. 1-4 the lengths of slider pads 18 and 19 are preferably equal to the length that the upper tube 15 and middle tube 16 sit inside their corresponding mating tube, i.e. middle tube 16 and lower tube 17, when the dual-purpose lift pedestal 10 is in the up position.

Although the tubes of the housing of the present invention may come in all sorts of shapes including but not limited to a circular shape, a triangular shape, a rectangular-shaped, the tubes 15, 16, and 17 of the housing 13 are shown as each comprising a square-shaped with the lower tube 17 having an internal cavity 30 sized to support the upper tube 15 and middle tube 16 therein in. Middle tube 16 may also include an internal cavity sized to support upper tube 15 therein.

Dual-purpose lift pedestal 10 also includes a gas spring cage 20 located and supported within the middle tube 16. Gas spring cage 20 at least partially support a first gas spring 21 and an opposing second gas spring 23 therein to provide dual-purpose lift pedestal 10 with telescoping features. That is, first gas spring 21 and second gas spring 23 are both supported within gas spring cage 20 and run parallel to each other within dual-purpose lift pedestal 10 but provide opposing forces within dual-purpose lift pedestal 10. First gas spring 21 includes an extendable arm 22 extending therefrom with the extendable arm 22 having an end 22a secured to the second side 11b of the top base plate 11. Second gas spring 23 includes extendable arm 24 having an end 24a secured to the first side 12a of the bottom base plate 12 with the gas springs 21 and 23 co-acting to assist the movement of the housing between the down position, the up position and the extended position.

In their operation, the second gas spring 23 pushes on the lower base plate 12, while the first gas spring 21 is affixed to the top base plate 11. The gas springs 21 and 23 offset the weight of the table top 14 to provide greater ease in the lifting and lowering of the table top 14 between the down position, the table-use up position and the fully extended position.

Although alternative embodiments of the present invention may comprise the first and second gas having the same spring pound force, in the embodiment of FIGS. 1-4 the first gas spring 21 has a different spring pound force then the second gas spring 23. For example, the first gas spring 21 may comprise a spring force of 50 lbs. while the second gas spring 23 may comprise a spring force of 60 lbs. or vice versa. In additional, although the embodiment of FIGS. 1-4 calls out for the use of gas springs, alternative embodiment of the present invention may use other types of springs including but not limited to pneumatic springs, hydraulic springs, and electric springs.

Figure 2:
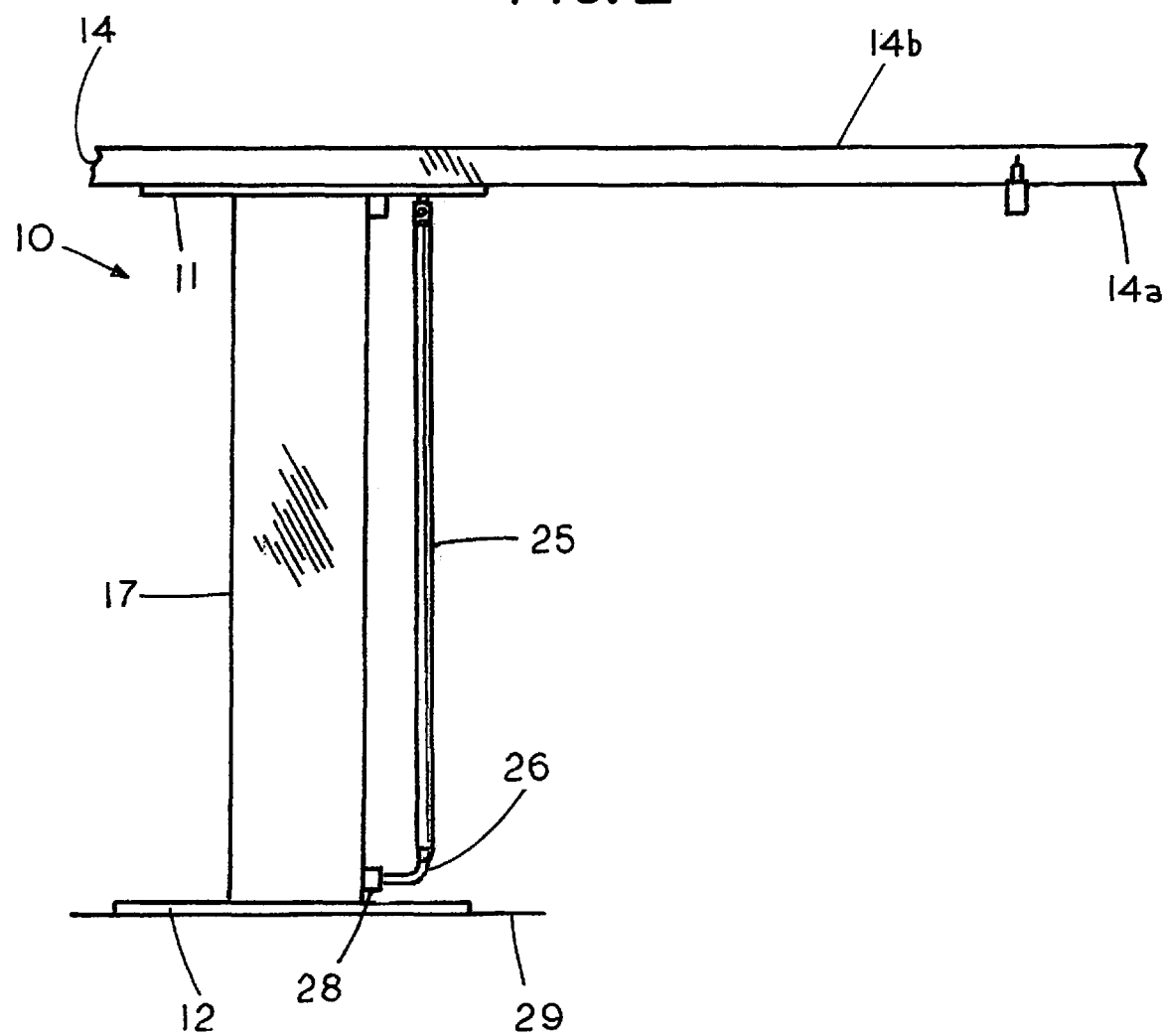
FIG. 2 is a side view showing the dual-purpose lift pedestal of FIG. 1 in a down position.
Figure 3:
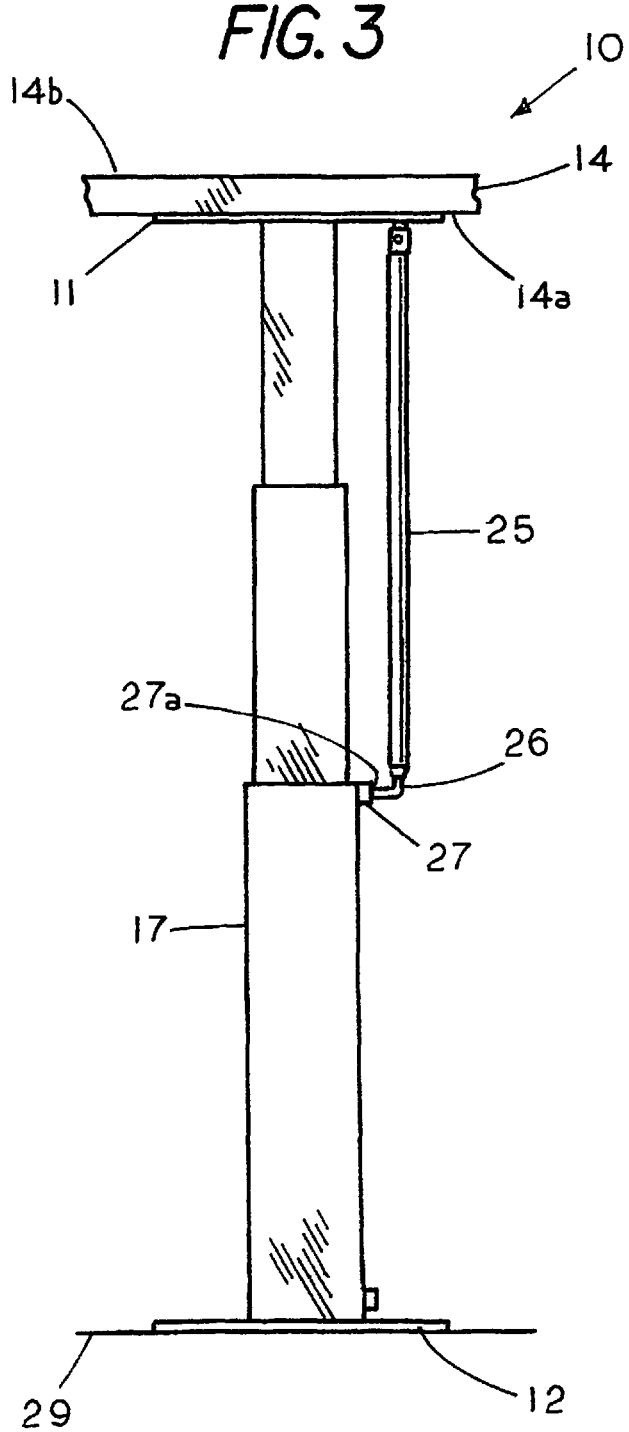
FIG. 3 is a side view showing the dual-purpose lift pedestal of FIG. 1 in an up position.
Figure 4:
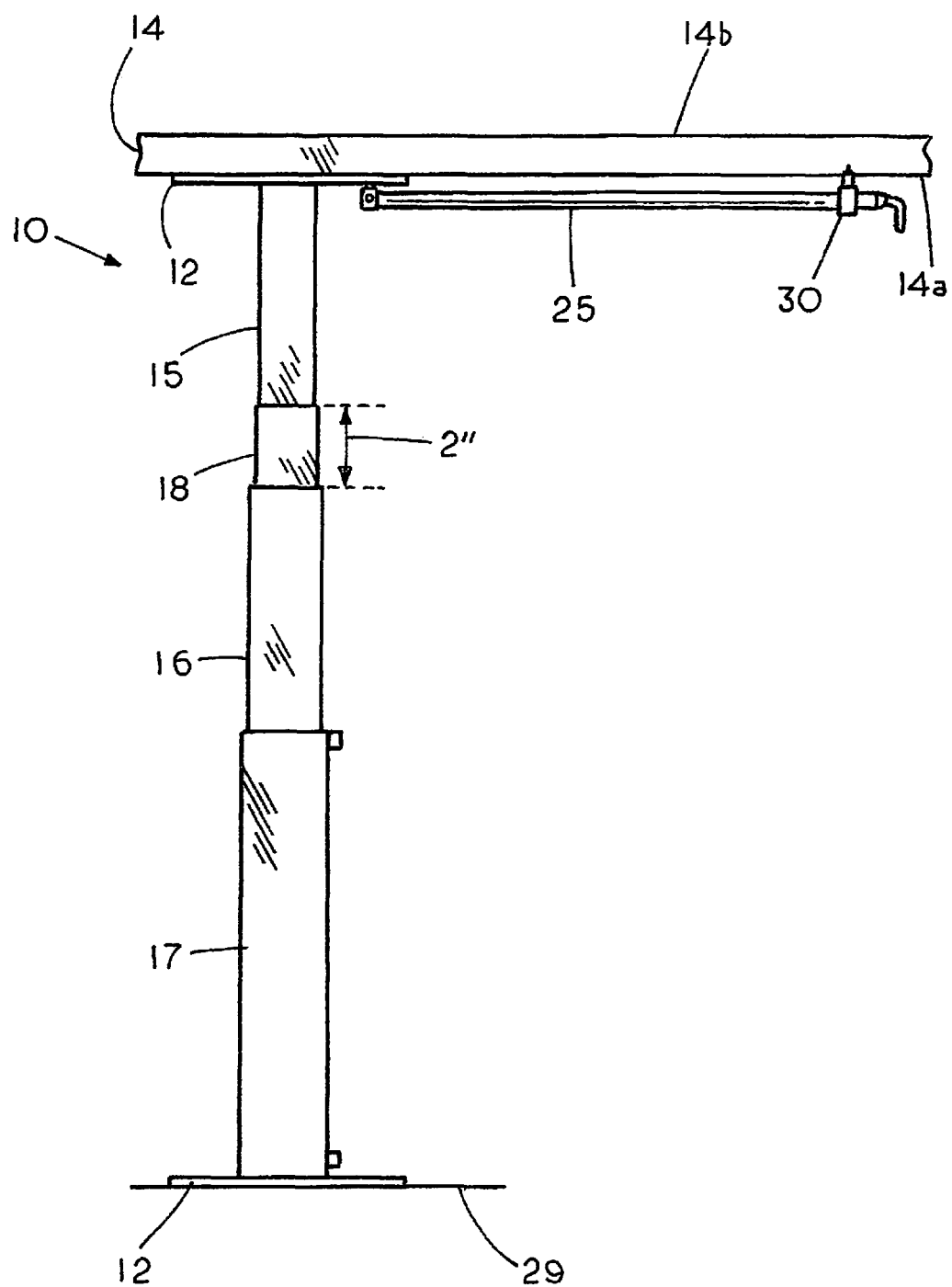
FIG. 4 is a side view showing the dual-purpose lift pedestal of FIG. 1 in a fully extended position.

In the embodiment of FIGS. 1-4, dual-purpose lift pedestal 10 is shown further including a swing support arm 25 having a first end 25a pivotably attached to the second side 11b of the top base plate 11 and a second end 25b having a securement member comprising a cotterless pin 26 matingly engageable to a first locking member comprising a receiving slot 27a of a bracket 27 located on an exterior surface 17c of the lower tube 17 to maintain the housing 13 in the up position as shown in FIG. 3. The exterior surface 17c of the lower tube 17 also includes a second locking member comprising a cotterless pin receiving slot 28 matingly engageable with the cotterless pin 26 of swing support arm 25 to maintain the housing 13 in the down position as shown in FIG. 2. When the swing support arm 25 is not needed, the swing support arm 25 may be swung up to a horizontal or semi-horizontal position and snapped into a retaining clip 30 that is fastened to the bottom surface 14a of table top 14 as shown in FIG. 4.

Referring to FIGS. 2-4, FIG. 2 is a side view showing dual-purpose lift pedestal 10 supporting table top 14 on a recreational vehicle floor 29 in the down position. The down position of dual-purpose lift pedestal 10 is identified as the position of dual-purpose lift pedestal 10 during which the top surface 14b of table top 14 may be used to support a bed cushion or the like thereon for sleeping and/or resting purposes. The dual-purpose lift pedestal 10 may be tuned to stay in the down position when as little as 8 lbs. of downward force is added or applied to the table top 14, which typically may be equivalent to the weight of the bed cushions. In alternative embodiments of the present invention, an adjustable pressure device may be added to the lower tube 17 to provide added pressure on the middle tube 16 or its slider pad(s) 19 when in the down position to discourage movement of the dual-purpose lift pedestal 10 while in the down position until an external upward force is used to lift the table top 14. It is noted that the down position may be visual identified by the upper tube 15 and middle tube 16 being mostly or a major portion of such is supported or located within the lower tube 17.

A feature of the present invention is that dual-purpose lift pedestal 10 also allows for the table top 14 to be removed from the dinette area of a recreational vehicle by simply lifting the table 14, top base plate 12, upper tube 15, and middle tube 16 out of the lower tube 17, and all that is left in the dinette area is the lower tube 17 and the lower base plate 12, which are affixed to the floor 29. This allows the owners access to areas in their dinette that may be needed.

As shown in FIG. 2, in order to maintain dual-purpose lift pedestal 10 in the down position, the cotterless pin 26 of swing support arm 25 may be matingly engaged to the cotterless pin receiving slot 28 to securely lock dual-purpose lift pedestal 10 in the down position. The dual-purpose lift pedestal 10 will be maintained locked in the down position until the user exerts manual force in the axial direction of the cotterless pin 26 perpendicular to the telescoping direction of the dual-purpose lift pedestal 10 to disengage the cotterless pin 26 from to the cotterless pin receiving slot 28 and unlock the dual-purpose lift pedestal 10 from the down position.

FIG. 3 is a side view showing dual-purpose lift pedestal 10 supporting a table top 14 on the recreational vehicle floor 29 in the up position. The up position of dual-purpose lift pedestal 10 is identified as the position of dual-purpose lift pedestal 10 during which the table top 14 is also supported on the recreational vehicle floor 29 by table legs to enable the table top 14 to mainly be use in a traditional dinette table manner in which the main support of table top 14 is preferably through the attached legs and dual-purpose lift pedestal 10 functions as a secondary source of support for the table top 14.

As shown in FIG. 3, in order to maintain dual-purpose lift pedestal 10 in the up position, the cotterless pin 26 of swing support arm 25 is matingly engaged to the receiving slot 27*a* of bracket 27 to securely lock dual-purpose lift pedestal 10 in the up position. It is noted that the dual-purpose lift pedestal 10 will be maintained locked in the up position until the user exerts manual force in the axial direction of the cotterless pin 26 perpendicular to the telescoping direction of the dual-purpose lift pedestal 10 to disengage the cotterless pin 26 from the receiving slot 27*a* of bracket 27 and unlock the dual-purpose lift pedestal 10 from the up position.

FIG. 4 is a side view showing dual-purpose lift pedestal 10 supporting table top 14 on the recreational vehicle floor 29 in the extended position. The extended position of dual-purpose lift pedestal 10 primarily allows for the attachment and detachment of table legs such as camper table legs to or from the bottom side 14*a* of a table top 14. It is noted that when dual-purpose lift pedestal 10 is in the extended position, dual-purpose lift pedestal 10 may provide for a table leg clearance of at least 2 to 2½ inches between a floor surface and the bottom surface 14*a* to allow for user attachment of table legs to the bottom side 14*a* of a table top 14 and user detachment of table legs from the bottom side 14*a* of a table top 14. It is noted that the extended position is the position in which the housing 13 is fully extended and may be identified by the visual presence of a portion of the first set of slide pads 18 being visibly exposed from middle tube 16.

Figure 5:
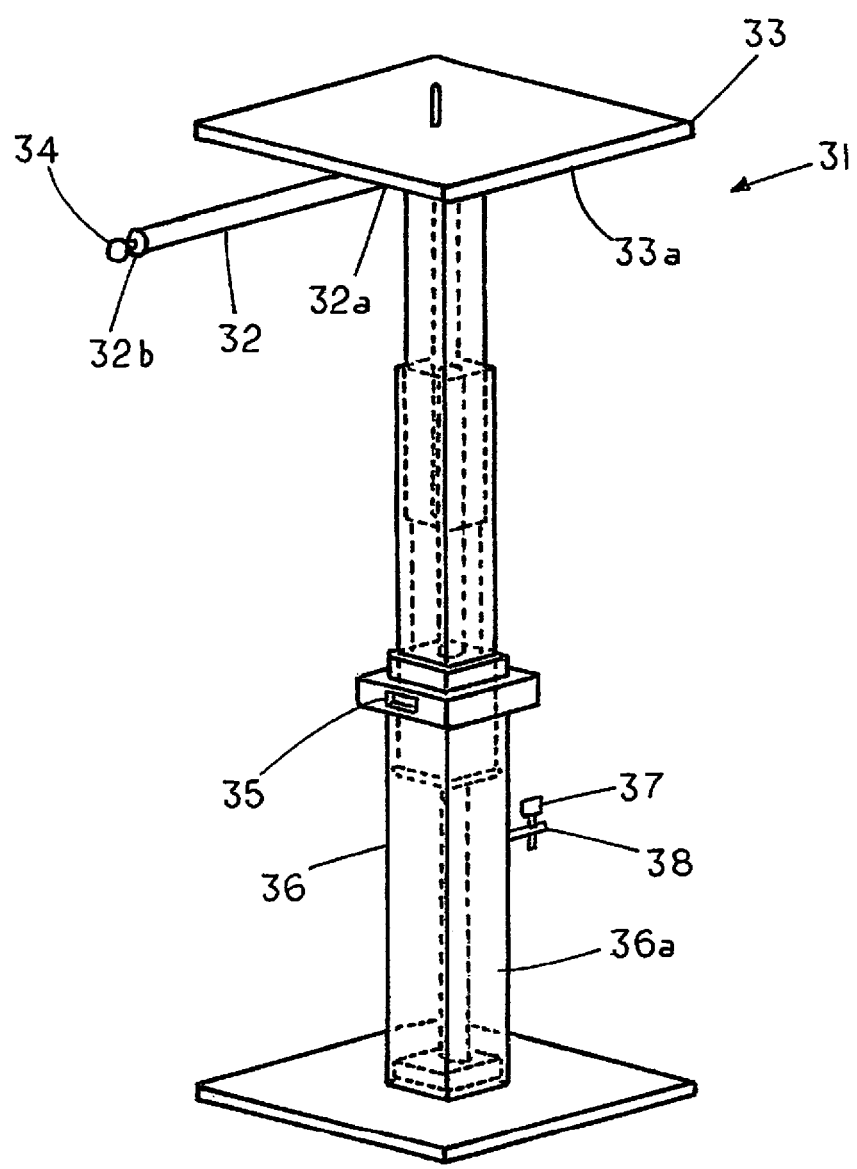
FIG. 5 is a side view showing an alternative embodiment of a dual-purpose lift pedestal in an up position.

FIG. 5 is a side view showing an alternative embodiment of a dual-purpose lift pedestal 31 in an up position. Dual-purpose lift pedestal 31 generally comprises similar corresponding parts to the dual-purpose lift pedestal 10 of FIGS. 1-4. However, dual-purpose lift pedestal 31 is shown including a swing support arm 32 having a first end 32*a* pivotably attached to a second side 33*a* of a top base plate 33 and a second end 32*b* having a securement member comprising a ball 34 matingly engageable to a locking member comprising a socket catch 35 located on an exterior surface 36*a* of a lower tube 36 to maintain the dual-purpose lift pedestal 31 in the up position.

The dual-purpose lift pedestal 31 of FIG. 5 is also shown to include a magnet 37 having at least an 8 (eight) pound pull rating supported on the exterior surface 36*a* of lower tube 36 by a bracket 38. The magnet 37 is engageable with the second side 33*a* of top base plate 33 when the dual-purpose lift pedestal 31 is in the down position and has sufficient pull to top base plate 33 to assist in maintaining the dual-purpose lift pedestal 31 in the down position.

I claim:

1. A dual-purpose lift pedestal comprising:
a top base plate having a table top engaging first side and a second side;
a bottom base plate having a first side and a second-floor engaging side;
a housing moveable between a sleep cushion supporting down position, a table-use up position and an extended position allowing for an installation of legs to a bottom side of a table top, said housing having an upper tube having a first end attached to said second side of said top base plate and a second end, a middle tube having a first end for receiving said second end of said upper tube and a second end, and a lower tube having a first end for receiving said second end of said middle tube and a second end attached to said first side of said bottom base plate;
a first set of slider pads located between and engaging the surfaces of said upper tube and the surfaces of said middle tube, said first set of slider pads supporting said second end of said upper tube within said middle tube by providing a force required to displace said upper tube with respect to said middle tube;
a second set of slider pads located between and engaging the surfaces of said middle tube and the surfaces of said lower tube, said second set of slider pads supporting said second end of said middle tube within said lower tube by providing a force required to displace said middle tube with respect to said lower tube;
a gas spring cage located within said middle tube;
a first gas spring at least partially supported within said gas spring cage, said first gas spring having an extendable arm extending therefrom, said extendable arm having an end secured to said second side of said top base plate;
a second gas spring at least partially supported within said gas spring cage, said second gas spring having an extendable arm extending therefrom, said extendable arm having an end secured to said first side of said bottom base plate with said gas springs co-acting to assist the movement of said housing between said down position, said up position and said extended position; and
a swing support arm having a first end pivotably attached to said second side of said top base plate and a second end having a securement member engageable to a first locking member located on said lower tube to maintain said housing in said up position and engageable to a second locking member located on said lower tube to maintain said housing in said down position.

2. The dual-purpose lift pedestal of claim 1 wherein said lower tube includes an internal cavity sized to support said upper tube and middle tube therein in.

3. The dual-purpose lift pedestal of claim 2 wherein said tubes of said housing comprises square-shaped tubes.

4. The dual-purpose lift pedestal of claim 3 including a retaining clip located on said bottom side of said table top for supporting said swing support arm in said extended position.

5. The dual-purpose lift pedestal of claim 3 including a magnet having at least an 8 (eight) pound pull rating located on an exterior surface of said lower tube and engageable with said top base plate when said housing is in said down position to assist in maintaining said housing in said down position.

6. The dual-purpose lift pedestal of claim 3 wherein said first locking member comprises a bracket located on an exterior surface of said lower tube with said bracket having a receiving slot and said securement member of said swing support arm comprising a cotterless pin engageable with said receiving slot of said bracket to maintain said housing in said up position.

7. The dual-purpose lift pedestal of claim 3 wherein said first locking member comprises a socket catch located on an exterior surface of said lower tube and said securement member of said swing support arm comprising a ball engageable with said socket catch to maintain said housing in said up position.

8. The dual-purpose lift pedestal of claim 3 wherein said first gas spring has a different spring pound force then said second gas spring.

9. A recreational vehicle dual-purpose lift pedestal comprising:
a top base plate having a table top engaging first side and a second side;
a bottom base plate having a first side and a second recreational vehicle floor engaging side;
a housing moveable between a sleep cushion supporting down position, a table-use up position and an extended position allowing for an installation of legs to a bottom side of a table top, said housing having an upper tube having a first end attached to said second side of said top base plate and a second end, a middle tube having a first end for receiving said second end of said upper tube and a second end, and a lower tube having a first end for receiving said second end of said middle tube and a second end attached to said first side of said bottom base plate;
a first set of slider pads located between and engaging the surfaces of said upper tube and the surfaces of said middle tube, said first set of slider pads supporting said second end of said upper tube within said middle tube by providing a force required to displace said upper tube with respect to said middle tube;
a second set of slider pads located between and engaging the surfaces of said middle tube and the surfaces of said lower tube, said second set of slider pads supporting said second end of said middle tube within said lower tube by providing a force required to displace said middle tube with respect to said lower tube;
a spring cage located within said middle tube;
a first spring at least partially supported within said spring cage, said first spring having an extendable arm extending therefrom, said extendable arm having an end secured to said second side of said top base plate;
a second spring at least partially supported within said spring cage, said second spring having an extendable arm extending therefrom, said extendable arm having an end secured to said first side of said bottom base plate with said springs co-acting to assist the movement of said housing between said down position, said up position and said extended position; and
a locking member for maintaining said housing at said upper position and at said down position.

10. The dual-purpose lift pedestal of claim 9 wherein said lower tube includes an internal cavity sized to support said upper tube and middle tube therein in.

11. The dual-purpose lift pedestal of claim 9 wherein said locking member for maintaining said housing at said upper position and at said down position comprises a swing support arm having a first end pivotably attached to said second side of said top base plate and a second end having a securement member engageable to a first locking member located on said lower tube to maintain said housing in said up position and engageable to a second locking member located on said lower tube to maintain said housing in said down position.

12. The dual-purpose lift pedestal of claim 11 wherein said first locking member comprises a bracket located on an exterior surface of said lower tube with said bracket having a receiving slot and said securement member of said swing support arm comprising a cotterless pin engageable with said receiving slot of said bracket to maintain said housing in said up position.

13. The dual-purpose lift pedestal of claim 11 including a retaining clip located on said bottom side of said table top for supporting said swing support arm in said extended position.

14. The dual-purpose lift pedestal of claim 11 wherein said first locking member comprises a socket catch located on an exterior surface of said lower tube and said securement member of said swing support arm comprising a ball engageable with said socket catch to maintain said housing in said up position.

15. The dual-purpose lift pedestal of claim 9 wherein said springs comprises gas springs.

16. The dual-purpose lift pedestal of claim 9 wherein said springs comprises pneumatic springs.

17. The dual-purpose lift pedestal of claim 9 wherein said springs comprises hydraulic springs.

18. The dual-purpose lift pedestal of claim 9 wherein said tubes of said housing comprises square-shaped tubes.

19. A dual-purpose lift pedestal comprising:
a top base plate having a table top engaging first side and a second side;
a bottom base plate having a first side and a second-floor engaging side;
a housing moveable between a sleep cushion supporting down position, a table-use up position and an extended position allowing for an installation of legs to a bottom side of a table top, said housing having a square-shaped upper tube having a first end attached to said second side of said top base plate and a second end, a square-shaped middle tube having a first end for receiving said second end of said upper tube and a second end, and a square-shaped lower tube having a first end for receiving said second end of said middle tube and a second end attached to said first side of said bottom base plate, said lower tube includes an internal cavity sized to support said upper tube and middle tube therein in;
a first set of slider pads located between and engaging the surfaces of said upper tube and the surfaces of said middle tube, said first set of slider pads supporting said second end of said upper tube within said middle tube by providing a force required to displace said upper tube with respect to said middle tube;
a second set of slider pads located between and engaging the surfaces of said middle tube and the surfaces of said lower tube, said second set of slider pads supporting said second end of said middle tube within said lower tube by providing a force required to displace said middle tube with respect to said lower tube;

a gas spring cage located within said middle tube;

a first gas spring at least partially supported within said gas spring cage, said first gas spring having an extendable arm extending therefrom, said extendable arm having an end secured to said second side of said top base plate;

a second gas spring at least partially supported within said gas spring cage, said second gas spring having an extendable arm extending therefrom, said extendable arm having an end secured to said first side of said bottom base plate with said gas springs co-acting to assist the movement of said housing between said down position, said up position and said extended position, said second gas spring having a different spring pound force then said second gas spring;

a swing support arm having a first end pivotably attached to said second side of said top base plate and a second end having a cotterless pin engageable to a first locking member located on said lower tube to maintain said housing in said up position and engageable to a second locking member located on said lower tube to maintain said housing in said down position;

a retaining clip located on said bottom side of said table top for supporting said swing support arm in said extended position.

20. The dual-purpose lift pedestal of claim 19 including a magnet located on an exterior surface of said lower tube and engageable with said top base plate when said housing is in said down position to assist in maintaining said housing in said down position.

* * * * *